United States Patent [10] Patent No.: US 10,802,258 B2
Miyake et al. (45) Date of Patent: Oct. 13, 2020

(54) MICROSCOPE INCLUDING AN ILLUMINATION OPTICAL SYSTEM HAVING A PLURALITY OF LENS ELEMENTS

(71) Applicant: NIKON CORPORATION, Tokyo (JP)

(72) Inventors: Norio Miyake, Tokyo (JP); Fumio Suzuki, Yokohama (JP); Hiroaki Nakayama, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 308 days.

(21) Appl. No.: 15/956,516

(22) Filed: Apr. 18, 2018

(65) Prior Publication Data

US 2018/0231755 A1 Aug. 16, 2018

Related U.S. Application Data

(63) Continuation of application No. PCT/JP2015/079455, filed on Oct. 19, 2015.

(51) Int. Cl.
  *G02B 21/06* (2006.01)
  *G02B 21/00* (2006.01)
  (Continued)

(52) U.S. Cl.
  CPC ........... *G02B 21/06* (2013.01); *G02B 3/0056* (2013.01); *G02B 21/0088* (2013.01);
  (Continued)

(58) Field of Classification Search
  CPC ...... G02B 3/00; G02B 3/0006; G02B 3/0037; G02B 3/0056; G02B 3/0062;
  (Continued)

(56) References Cited

U.S. PATENT DOCUMENTS 6,985,288 B2 * 1/2006 Miyashita ............... G02B 21/12
                                                        359/385
8,014,064 B2 * 9/2011 Shimamoto ........... G02B 21/08
                                                        359/368
(Continued)

FOREIGN PATENT DOCUMENTS

JP    2009-069691 A    4/2009
JP    2009-276544 A    11/2009
(Continued)

OTHER PUBLICATIONS

Apr. 2, 2019 Office Action issued in Japanese Patent Application No. 2017-546293.
(Continued)

*Primary Examiner* — Arnel C Lavarias
(74) *Attorney, Agent, or Firm* — Oliff PLC (57) ABSTRACT

A microscope including an illumination optical system having an objective lens and a fly-eye lens, where: the fly-eye lens having a plurality of lens elements; in the illumination optical system, images of the plurality of lens elements are projected on a pupil of the objective lens; and the number ($n_1$) of the images of the lens elements projected inside the pupil of the objective lens is more than the number ($n_2$) of the images of the lens elements projected on an outer perimeter of the pupil of the objective lens. In the above observation optical system, a first objective lens having a first pupil diameter and a second objective lens having a pupil diameter larger than the first pupil diameter are switchable, and a number $n_1$ may be greater than a number $n_2$ with respect to the first objective lens.

8 Claims, 10 Drawing Sheets

(51) Int. Cl.
   *G02B 27/09* (2006.01)
   *G02B 3/00* (2006.01)
   *G02B 21/08* (2006.01)
   *G03B 21/625* (2014.01)

(52) U.S. Cl.
   CPC ....... *G02B 21/082* (2013.01); *G02B 27/0905* (2013.01); *G02B 27/0961* (2013.01); *G03B 21/625* (2013.01)

(58) Field of Classification Search
   CPC .... G02B 3/0068; G02B 3/0075; G02B 19/00; G02B 19/19; G02B 19/0004; G02B 19/0009; G02B 19/0014; G02B 19/0047; G02B 19/0052; G02B 19/0061; G02B 21/00; G02B 21/0004; G02B 21/002; G02B 21/0032; G02B 21/0052; G02B 21/0076; G02B 21/06; G02B 21/08; G02B 21/082; G02B 21/36; G02B 21/361; G02B 27/0905; G02B 27/0916; G02B 27/0927; G02B 27/0938; G02B 27/095; G02B 27/0955; G02B 27/0961; G02B 27/106; G02B 27/12; G02B 27/123

USPC ....... 359/362, 363, 368, 369, 379, 380, 385, 359/388, 389, 390, 618, 619, 620, 621, 359/622, 623, 624, 625, 626, 628
   See application file for complete search history.

(56) References Cited

U.S. PATENT DOCUMENTS

2009/0073695 A1   3/2009   Shimamoto
   2009/0284833 A1   11/2009  Shimamoto
   2011/0235170 A1   9/2011   Kawasaki

FOREIGN PATENT DOCUMENTS

JP   2010-134191 A   6/2010
   JP   2010-145780 A   7/2010
   JP   2012-118139 A   6/2012

OTHER PUBLICATIONS

May 23, 2019 extended Search Report issued in European Patent Application No. 15906635.6.
   Jan. 19, 2016 International Search Report issued in International Patent Application No. PCT/JP2015/079455.
   Apr. 24, 2018 International Preliminary Report on Patentability issued in International Patent Application No. PCT/JP2015/079455.

* cited by examiner

MICROSCOPE INCLUDING AN ILLUMINATION OPTICAL SYSTEM HAVING A PLURALITY OF LENS ELEMENTS

The contents of the following International patent application are incorporated herein by reference:
NO. PCT/JP2015/079455 filed on Oct. 19, 2015.

BACKGROUND

1. Technical Field

The present invention relates to a microscope.

2 Related Art

In order to uniformly illuminate a field of vision, there is a microscope with a fly-eye lens (refer to Patent Document 1, for example).
Patent Document 1: US 2011/0235170 A1.
It is desired to perform more uniform illumination using a microscope with a fly-eye lens.

SUMMARY

In one aspect of the present invention, a microscope includes an illumination optical system having an objective lens and a fly-eye lens where: the fly-eye lens have a plurality of lens elements; in the illumination optical system, images of the plurality of lens elements are projected on a pupil of the objective lens; and the number ($n_1$) of the images of the lens elements projected inside the pupil of the objective lens is more than the number ($n_2$) of the images of the lens elements projected on an outer perimeter of the pupil of the objective lens.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and not all the combinations of the features described in the embodiments are necessarily essential to means provided by aspects of the invention.

Figure 1:
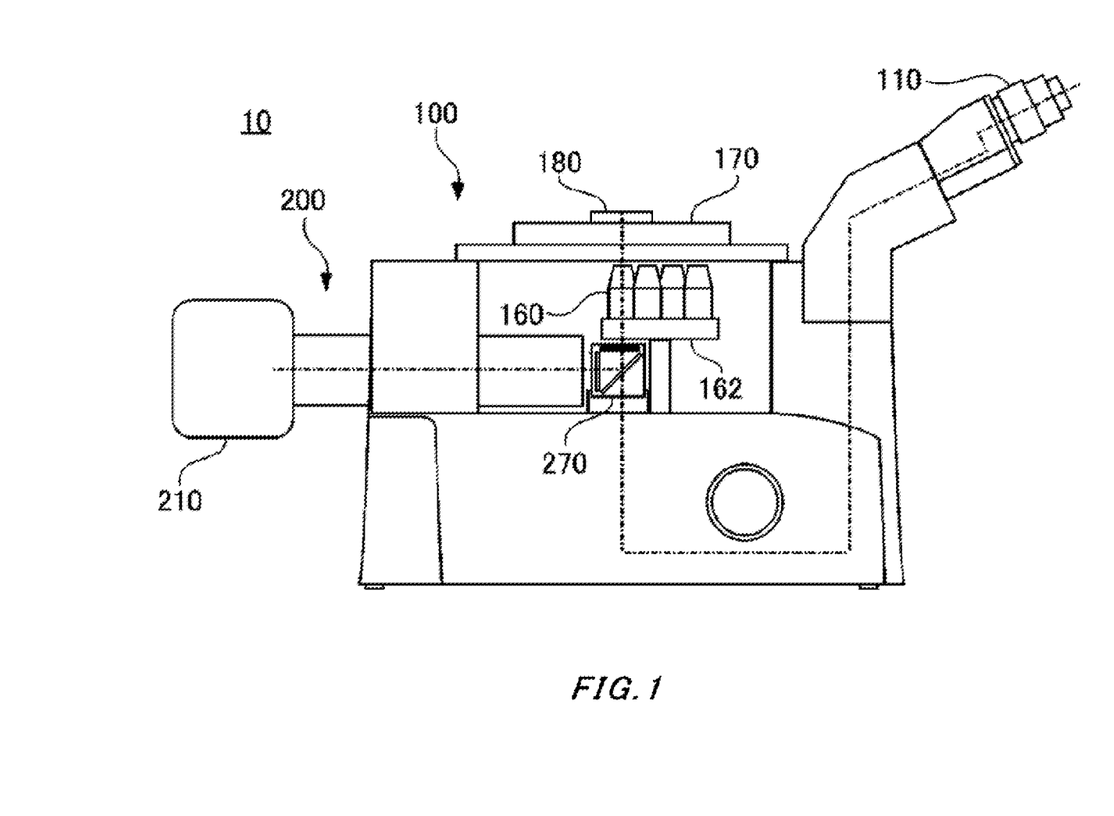
FIG. 1 is a schematic diagram of a microscope.

FIG. 1 is a schematic diagram of a microscope 10. The microscope 10 includes an observation optical system 100, an illumination optical system 200, and a light source 210.

The observation optical system 100 forms an image of a sample 180. The observation optical system 100 has an eye piece 110 and an objective lens 160.

The objective lens 160 is disposed directly under the sample 180 placed on a stage 170, so as to face toward the sample 180. In the example of the diagram, a plurality of objective lenses 160 are attached to a revolver 162, where the plurality of objective lenses 160 have respective magnification and objective pupil diameters of the objective lenses, which are different from each other.

The stage 170 has an observation hole that allows illumination and observation of the sample 180 from the lower side of the diagram, and the sample 180 is placed on the stage 170 to be an object for observation. Also, the stage 170 can be moved separately in the horizontal direction or the vertical direction in an environment where the microscope 10 is put down.

The illumination optical system 200 irradiates illumination light emitted from the light source 210 to the sample 180. A filter cube 270 is disposed directly under the objective lens 160. The filter cube 270 will be described below in detail.

Figure 2:
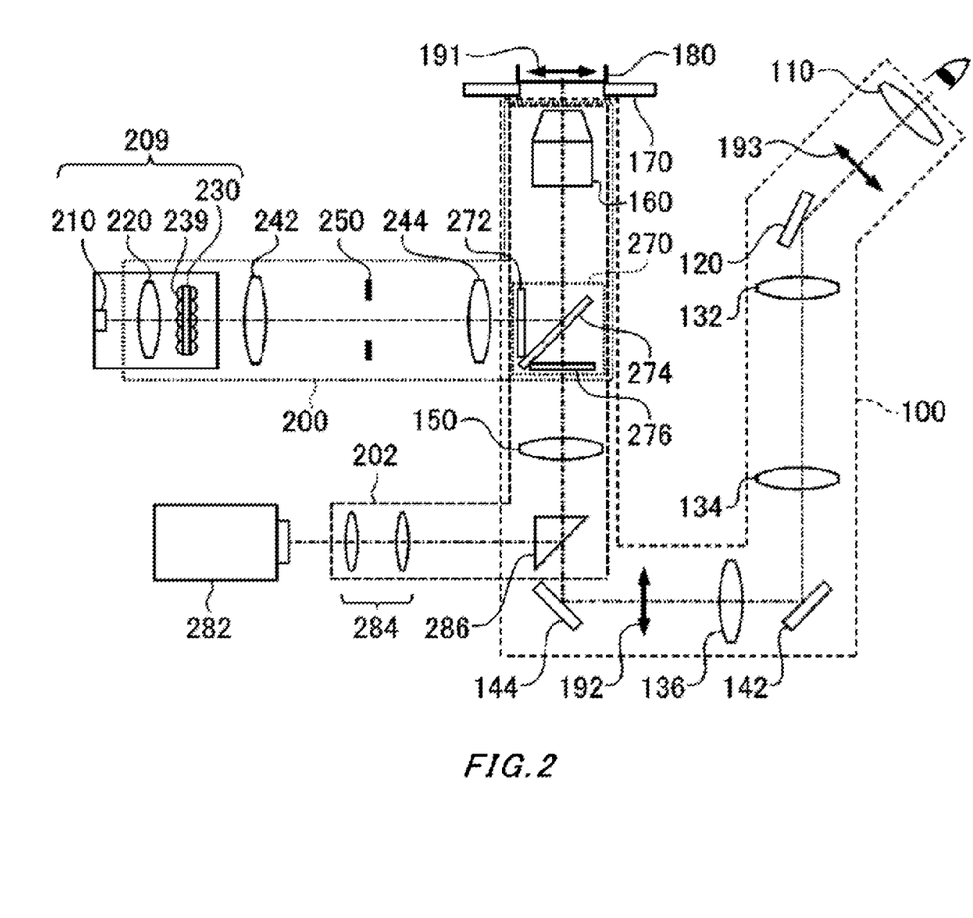
FIG. 2 is a schematic diagram showing an optical configuration of the microscope.

FIG. 2 is a schematic diagram showing an optical configuration of the microscope 10.

The observation optical system 100 includes the objective lens 160, the filter cube 270, an imaging lens 150, a plurality of relay lenses 132, 134, and 136 and a plurality of reflection mirrors 120, 142, and 144.

The objective lens 160 is disposed such that it faces toward an observation surface 191 for a sample 180. Through the objective lens 160 and the imaging lens 150, a primary image 192 of the sample 180 placed on the stage 170 is formed.

A secondary image 193 is formed via the relay lenses 132, 134, and 136 which relay the primary image 192 formed by the imaging lens 150. A user of the microscope 10 observes the secondary image 193 through the eye piece 110.

The filter cube 270 is disposed between the objective lens 160 and the imaging lens 150. The filter cube 270 has an excitation filter 272, a dichroic mirror 274, and a barrier filter 276. The excitation filter 272 has a characteristic of, for example, selectively transmitting light in a bandwidth that generates fluorescence to the sample 180 (excitation light), while blocking light in the other bandwidths.

The dichroic mirror 274 reflects illumination light irradiated from the illumination optical system 200, as well as transmitting observation light such as fluorescence emanated from the sample 180. Thereby, the illumination optical system 200 can perform illumination or excitation of the sample 180 from the same side of the objective lens 160. The barrier filter 276 has a characteristic of blocking light in bandwidths, except where the fluorescence is emanated from the sample 180.

The reflection mirrors 120, 142 and 144 bend an optical path of the observation optical system 100.

The microscope 10 includes a second observation optical system 202, and a camera 282 that takes an observed image formed by the second observation system 202. The second observation optical system 202 shares the objective lens 160, the filter cube 270, and the imaging lens 150 with the observation optical system 100. Also, the second observation optical system 202 has relay lenses 284 and a prism 286. The prism 286 is replaceably disposed on an optical path of the second observation optical system 202 to reflect observation light and direct it to the relay lenses 284. The relay lenses 284 direct the reflected observation light to the camera 282 to form an image. The camera 282 uses an image sensor such as a CCD sensor or a CMOS sensor to convert the observed image into an electrical signal to output.

The illumination optical system 200 has a collector lens 220, a fly-eye lens 230, relay lenses 242 and 244, and a field stop 250. In addition, the objective lens 160 in the observation optical system 100 also acts as a condenser lens in the illumination optical system 200. Furthermore, the illumination optical system 200 shares the filter cube 270 with the observation optical system 100.

A light emitter such as an LED, an LD or the like is used as the light source 210. The collector lens 220 is disposed at a position where its front focus coincide with a light-emitting surface of the light source 210, and makes illumination light emitted from the light source 210 into substantially parallel light.

Figure 3:
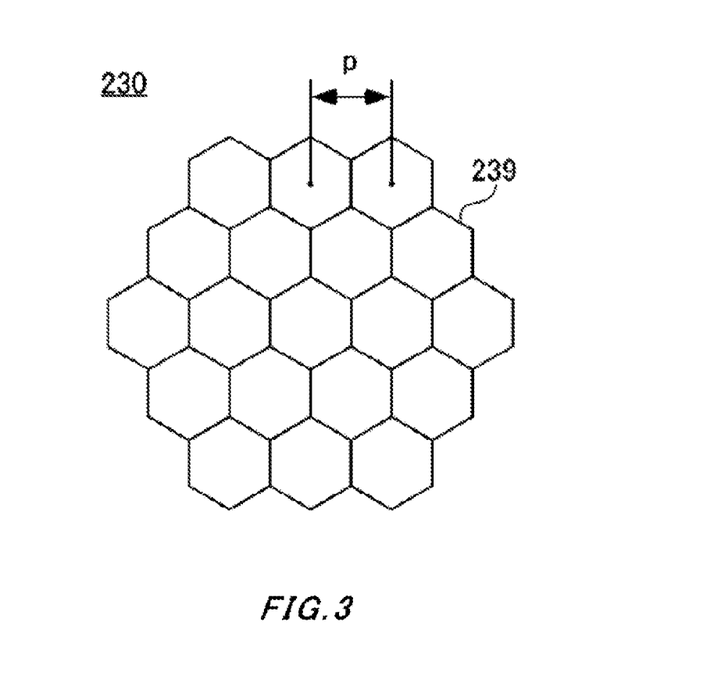
FIG. 3 is a drawing illustrating a fly-eye lens.

As shown in FIG. 3, the fly-eye lens 230 has a plurality of lens elements 239.

The illumination light radiated from the light source 210 and made into substantially parallel light at the collector lens 220 enters an incident end surface of the fly-eye lens 230. Also, on an emission end surface of the fly-eye lens 230, a light source image of the light source 210 is formed on each lens element 239.

A pair of relay lenses 242 and 244 is disposed between the fly-eye lens 230 and the objective lens 160. The emission end surface of the fly-eye lens 230 is disposed at a pupil conjugate position which is a position conjugate to a pupil position (rear focal position) of the objective lens 160, or vicinity thereto. Note that, the vicinity of the pupil conjugate position is within ±15 mm from the pupil conjugate position, for example.

The incident end surface of the fly-eye lens 230 is disposed at a position conjugate to the field stop 250. In the example of FIG. 2, the field stop 250 is disposed between the pair of relay lenses 242 and 244.

As described above, since the emission end surface of the fly-eye lens 230 is disposed at a position conjugate to the pupil position (rear focal position) of the objective lens 160 (pupil conjugate position) or vicinity thereto, images of the lens elements 239 are projected on the pupil of the objective lens 160 through the pair of relay lenses 242 and 244, forming a secondary light source.

At a position for the field stop 250, images on incident end surfaces of the plurality of lens elements 239 are formed such that they overlap with each other. An image conjugate to this image is formed on the observation surface 191 holding the sample 180, and illuminate the sample 180.

The illumination light source 210, the collector lens 220 and the fly-eye lens 230 may collectively form a replacement unit 209, which can be collectively replaced according to an application of the microscope 10. For example, when using an LED with a long emission wavelength of 470 nm, a resin fly-eye lens 230 may be used. In this case, for example, the LED with a long emission wavelength of 470 nm, the collector lens 220, and the resin fly-eye lens 230 may be combined so that to they can be collectively replaced. Also, when using an LED with a short emission wavelength of 385 nm, 455 nm etc., a quartz or silicone resin fly-eye lens 230 may be used. In this case, the LED with a short emission wavelength of 385 nm, 455 nm etc., the collector lens 220 and the quartz or silicone resin fly-eye lens 230 may be combined so that to they can be collectively replaced.

FIG. 3 is a drawing showing a configuration of the fly-eye lens 230. The fly-eye lens 230 has a configuration in which the lens elements 239, each of which is hexagonal, are disposed in a beehive (honeycomb) pattern. As one example, each lens element 239 has the same curvature radiuses on its incident side and emission side, and when a parallel luminous flux enters from the incident side, it is converged on the emission end surface.

Figure 4:
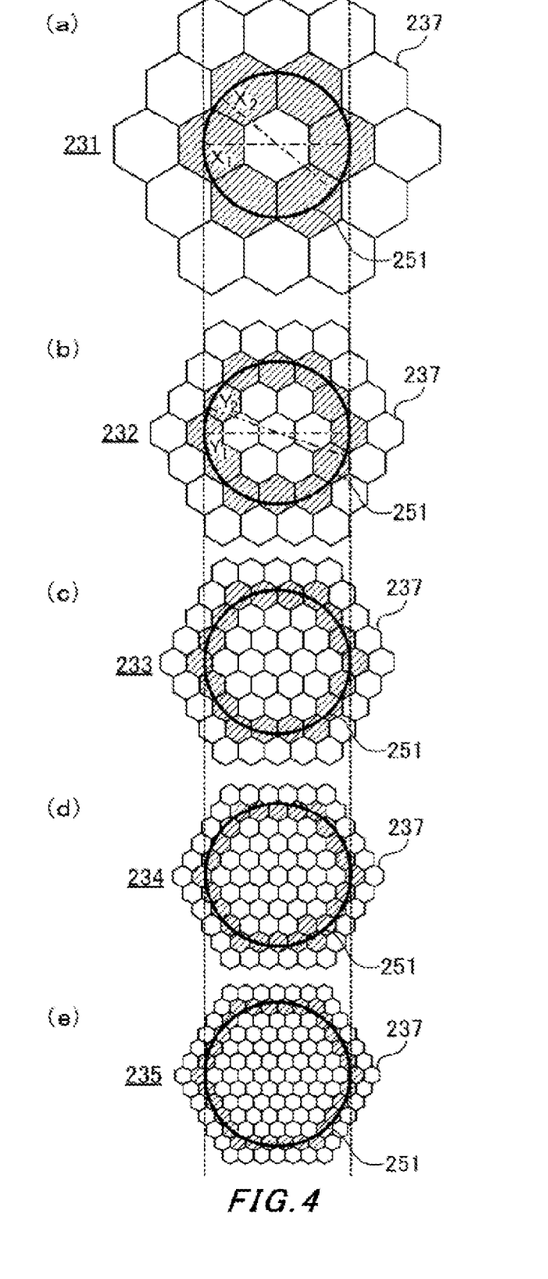
FIG. 4 is a drawing illustrating images of lens elements.

(a) to (e) in FIG. 4 are drawings respectively showing images of fly-eye lenses 231, 232, 233, 234 and 235 which are projected on a pupil surface of the objective lens 160. In (a) to (e) of FIG. 4, the sizes of pupils 251 are the same, whereas respective sizes of images 237 of the lens elements 239 projected on the pupils 251 are different.

Here, in (a) to (e) of FIG. 4, the images 237 of the lens elements are projected on an outer perimeter of the pupils 251. The inventers of the present invention have found out that the images 237 of the lens elements projected on the outer perimeter of the pupils 251 affect unevenness in the illumination light. For example, in (a) of FIG. 4, because ratio of the images 237 of the lens element that pass through the pupil 251 to the images 237 projected on the outer perimeter of the pupil 251, that is, proportion of the images 237 contributing as illumination light differs between the X1 direction and the X2 direction in the drawing, two-dimensional unevenness in the illumination light is affected. The same can be said for the direction Y1 and the direction Y2 in the drawing (b) of FIG. 4.

Therefore, the inventers have examined effect of the lens elements 239 projected on the outer perimeter of the pupil 251 upon two-dimensional unevenness in the illumination light. Specifically, they have simulated, from (a) to (e) of FIG. 4, their respective illuminance distributions on the observation surface 191. In the simulation, the illuminance distributions are calculated in one-dimensional direction.

First, as shown in (a) of FIG. 4, the number of the images 237 of the lens elements in the image 231 of the fly-eye lens projected on the pupil 251 is as follows. In an image 231 of the fly-eye lens, the number ($n_2$) of the images 237 of the lens elements projected on the outer perimeter of the pupil 251 is 6. In other words, $n_2$ is the number of the images 237 of the lens elements that cross the outer perimeter of the pupil 251. On the other hand, the number ($n_1$) of the images 237 of the lens elements projected inside the pupil 251 is 1. In other words, $n_1$ is the number of the images 237 of the lens elements surrounded by the images 237 of the 6 lens elements that cross the outer perimeter of the pupil 251.

$n_2$ and $n_1$ of the image 232 of the fly-eye lens shown in (b) of FIG. 4 are 12 and 7 respectively. Relations between the $n_1$ and $n_2$ are shown in Table 1, together with other examples not shown in FIG. 4.

TABLE 1

| | NUMBER OF ELEMENTS | | |
|---|---|---|---|
| NUMBER n | INNER REGION $n_1$ | PERIPHERAL REGION $n_2$ | INSIDE/OUTSIDE RATIO $n_1/n_2$ |
| 1 | 1 | 6 | 0.1667 |
| 2 | 7 | 12 | 0.5833 |
| 3 | 19 | 18 | 1.0566 |
| 4 | 37 | 24 | 1.5417 |
| 5 | 61 | 30 | 2.0333 |

TABLE 1-continued

| | NUMBER OF ELEMENTS | | |
|---|---|---|---|
| NUMBER n | INNER REGION $n_1$ | PERIPHERAL REGION $n_2$ | INSIDE/OUTSIDE RATIO $n_1/n_2$ |
| 6 | 91 | 36 | 2.5278 |
| 7 | 127 | 42 | 3.0238 |
| 8 | 169 | 48 | 3.5208 |
| 9 | 217 | 54 | 4.0185 |
| 10 | 271 | 60 | 4.5167 |

Figure 5:
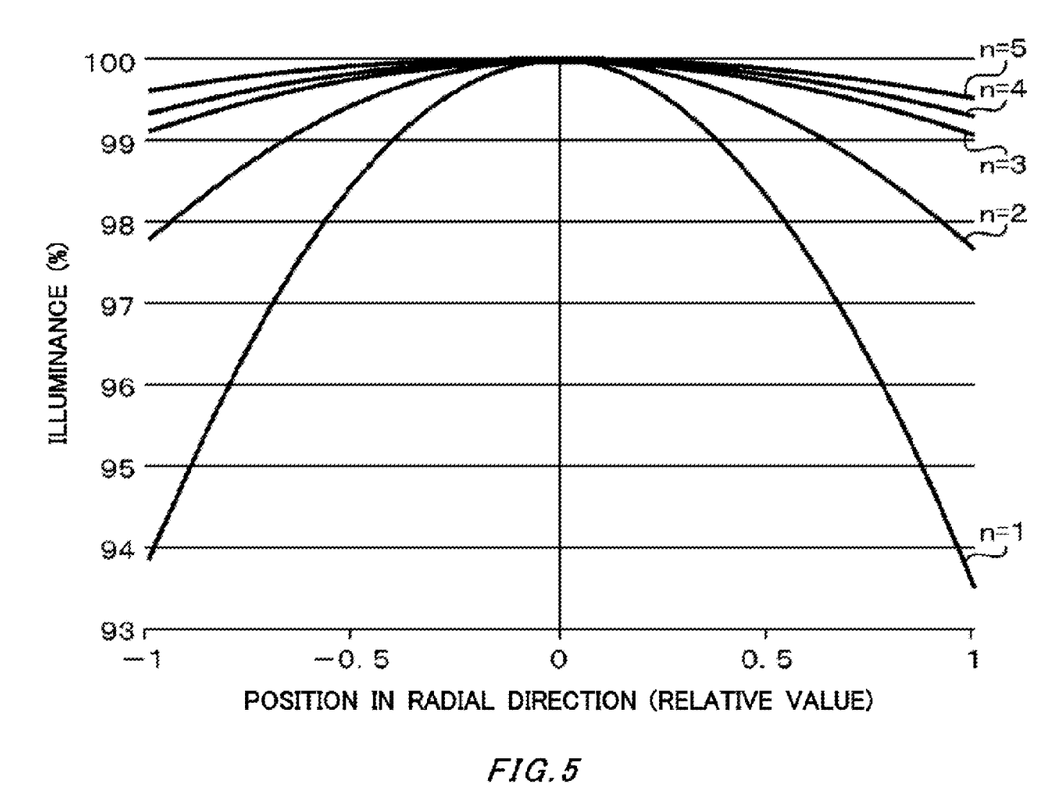
FIG. 5 is a graph showing illuminance distributions in an illumination optical system.

FIG. 5 is a graph showing respective simulation results of illuminance distributions on the observation surface 191, which correspond to (a) to (e) of FIG. 4.

As shown in FIG. 5, it is found out that, with respect to (a) to (e) of FIG. 4, respectively, when the number ($n_1$) of lens elements 239 projected inside the pupil 251 is greater than the number ($n_2$) of lens elements 239 projected on the outer perimeter of the pupil 251 (that is, when $n_1 > n_2$), change of illuminance is less than 1% in the one-dimensional direction on the observation surface 191. Thus, it can be assumed that the illuminance is substantially uniform as the change of illuminance is less than 1% in the one-dimensional direction on the observation surface 191, and the effect upon unevenness of the illuminance distribution in the two-dimensional direction can be reduced. In other words, by making $n_1 > n_2$, the illuminance distribution in the one-dimensional direction on the observation surface 191 becomes substantially uniform, thus the effect upon unevenness in the illuminance distribution in the two-dimensional direction caused by the images 237 of the lens elements projected on the outer perimeter of the pupil 251 can be reduced. Accordingly, the unevenness in the two-dimensional direction on the observation surface 191 is reduced.

Figure 6:
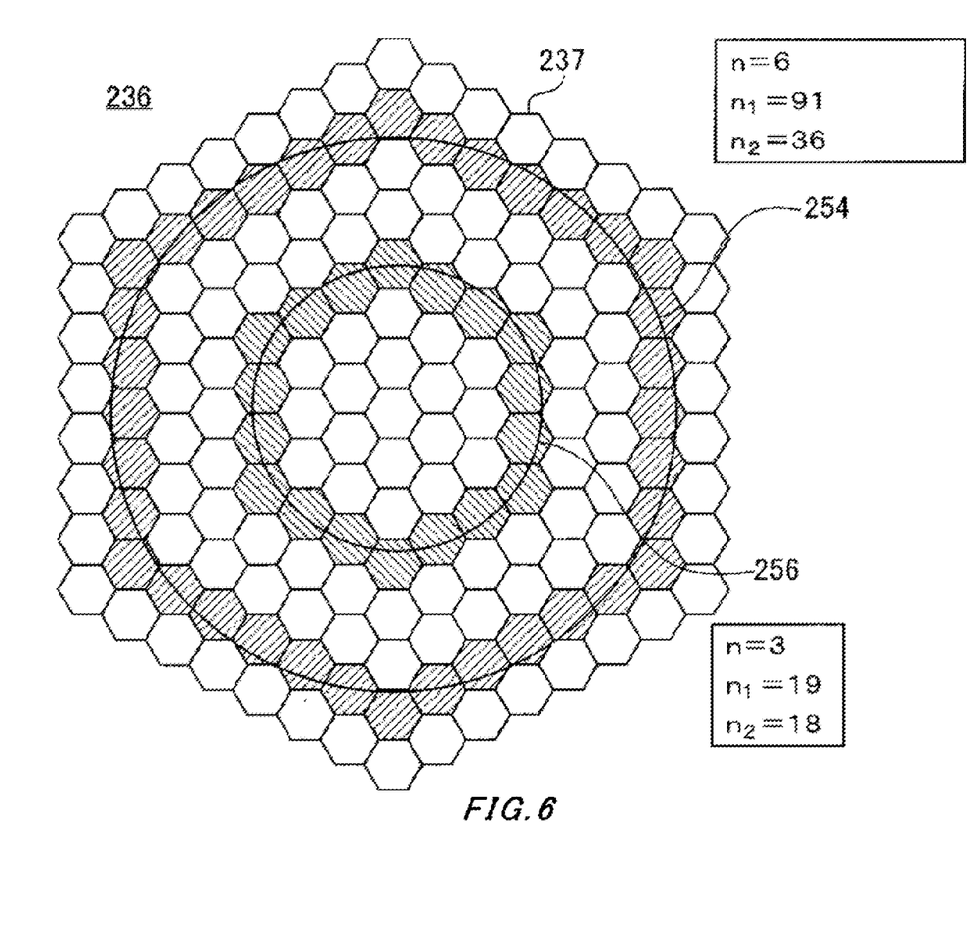
FIG. 6 is a schematic diagram showing a relation between an image of the fly-eye lens and a pupil diameter.

FIG. 6 is a diagram for explaining correspondence of an image 236 of the lens elements 239 with change of a pupil diameter in the microscope 10. The microscope 10 includes the plurality of objective lenses 160 attached to the revolver 162, and can easily switch between the objective lenses 160 to use for observation.

Upon changing the objective lens 160 to use, a pupil diameter may change. For example, when a magnification of the objective lens 160 is changed from ×10 to ×40, a pupil diameter may get smaller. That is, upon changing the objective lens 160 to use, a pupil 254 may change to a pupil 256 as shown in FIG. 6. Therefore, in the microscope 10, the illumination optical system 200 is configured so as to maintain the above condition, i.e., $n_1 > n_2$, even when the objective lens 160 is switched and a pupil diameter gets smaller, in order to realize a microscope 10 of which uniformity of illumination light illuminance on the observation surface 191 does not drop by changing the objective lens 160 to be formed.

In the example of FIG. 6, the illumination optical system 200 can be configured so as to maintain the relation of $n_1 > n_2$, even for the pupil 256 with a small pupil diameter.

In other words, a first objective lens having a first pupil diameter and a second objective lens having a second pupil diameter smaller than the first pupil diameter are switchable, and it is preferable to configure the illumination optical system 200 such that the number $n_1$ is greater than the number $n_2$ with respect to the second objective lens. Particularly, when using more than or equal to 3 switchable objective lenses having pupil diameters different from each other, it is preferable to configure the illumination optical system 200 such that the number $n_1$ is greater than the number $n_2$ with respect to an objective lens with the smallest pupil diameter among the plurality of objective lenses. Thereby, in the microscope 10, even when the objective lens 160 with a small pupil diameter is selected, an entire field of vision is uniformly illuminated.

Figure 7:
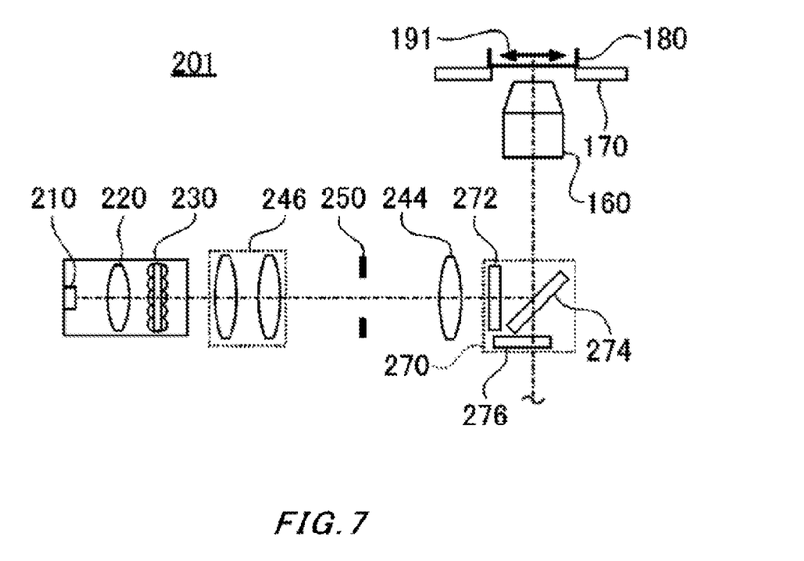
FIG. 7 is a schematic diagram showing a configuration of another illumination optical system.

FIG. 7 is a schematic diagram showing a configuration of another illumination optical system 201. The illumination optical system 201 has the same configuration as that of the illumination optical system 200 shown in FIG. 2 except for the portions described below, thereby the same reference numerals are used for the components in common and redundant descriptions are omitted.

The illumination optical system 201 is different from the illumination optical system 200, as it has a variable magnification optical system 246 formed of a plurality of lenses instead of having one of the relay lenses 242. When magnification of the variable magnification optical system 246 is changed, the size of an image of the fly-eye lens 230 to be projected on a pupil surface changes.

Figure 8:
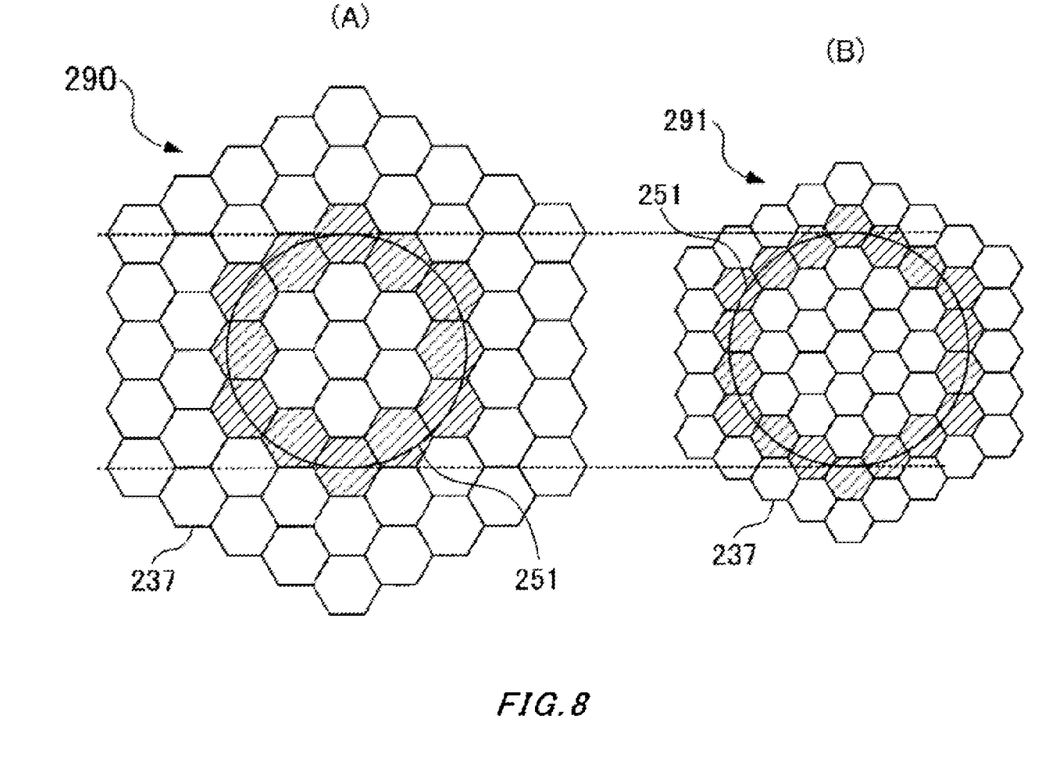
FIG. 8 is a drawing for explaining an image of a fly-eye lens using a variable magnification optical system.

FIG. 8 is a drawing for explaining an image of the fly-eye lens 230 through the variable magnification optical system 246. In certain magnification of the variable magnification optical system 246, as shown in (A) of FIG. 8 for example, assume that, in an image 290 of the fly-eye lens, the number ($n_2$) of images 237 of lens elements projected on an outer perimeter of a pupil 251 is 12, whereas the number ($n_1$) of images 237 of lens elements projected inside the pupil 251 is 7.

In the illumination optical system 201, by using the variable magnification optical system 246, the size of an image of the fly-eye lens 230 to be projected on the pupil 251 can be changed. Therefore, as shown in (B) of FIG. 8, $n_1$ and $n_2$ can be 19 and 18 respectively, by changing magnification of the variable magnification optical system 246 smaller to reduce the size of an image 291 of the fly-eye lens 230 more than the size of the image 290 of the fly-eye lens 230. In this way, by using the variable magnification optical system 246, the $n_1 > n_2$ condition can be satisfied without changing the fly-eye lens 230 itself.

Figure 9:
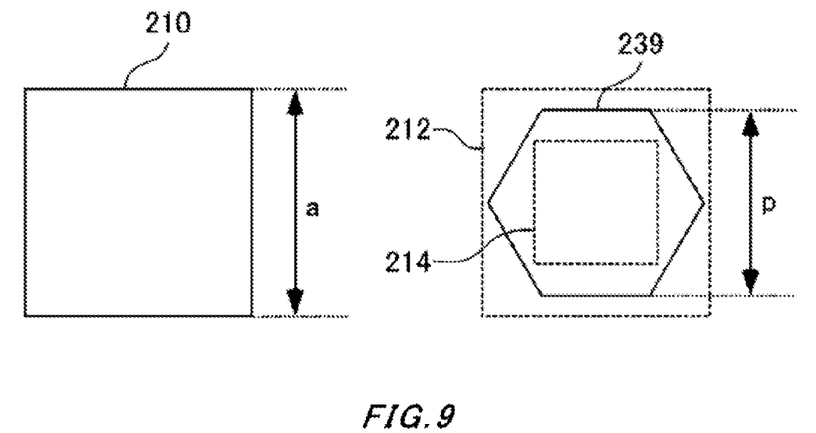
FIG. 9 is a schematic diagram showing a light source image formed on a lens element.

FIG. 9 is a diagram showing an image of the light source 210 projected on an emission surface of the fly-eye lens 230 in the illumination optical system 200. Shown in the illustrated example is a case in which an LED with a square light-emitting surface is used as the light source 210. As shown in FIG. 9, a is a length of each side of the light source 210. Also, a gap between parallel sides opposing to each other of the lens element 239 is equal to an element pitch p.

Magnification of the light source 210 projected on the emission surface of the fly-eye lens 230 can be expressed by ($f_{FE}/f_{cl}$), where $f_{cl}$ and $f_{FE}$ are the focal distance of the collector lens 220 and the focal distance of the lens elements 239 respectively. Thus, the length of one side of the image of the light source 210 projected on the emission surface of the fly-eye lens 230 is $(f_{FE}/f_{cl})a$, and the area in which the LED is projected on each of the emission surfaces of the lens elements 239 can be expressed by $(f_{FE}/f_{cl})^2 a^2$.

The area of the emission surfaces of the lens elements 239 is $((3^{1/2} \cdot p^2)/2)$. Here, as shown in an image 214 of the light source 210, when the image of the light source 210 is projected inside the emission surface of the lens element 239, a filling rate of the image of the light source 210 in the lens element 239 can be defined as a ratio of the area of the image of the light source 210 to the area of the lens element 239.

With respect to the above definition, it is preferable for the filling rate to be more than or equal to 50%. It is because, if the filling rate is less than 50%, the area of the image of the light source 210 in a pupil 252 is reduced, and thus a substantial NA drops. A condition therefor of the illumination optical system 200 is expressed as follows, where a is the length of one side of the light source 210.

$$p \leq \frac{2}{\sqrt[4]{3}} a \left( \frac{f_{FE}}{f_{cl}} \right) \quad \text{[Equation 1]}$$

When an image of the light source 210 is larger than the emission surface of the lens element 239, such as the image 212 of the light source 210 for example, it is preferable to make the length of one side of the image of the light source 210 shorter than a maximum length of the lens element 239 (the distance between opposite vertices in FIG. 9). It is because, if the length of one side of the image of the light source 210 on the lens element 239 is longer than the maximum length of the lens element 239, it causes a loss of light amount and flare. Therefore, the pitch p of the lens element 239 is expressed as follows, where a is the one side length of the light source 210.

$$\frac{\sqrt{3}}{2} a \left( \frac{f_{FE}}{f_{cl}} \right) \leq p \quad \text{[Equation 2]}$$

The following condition can be formed from the two equations above.

$$\frac{\sqrt{3}}{2} a \left( \frac{f_{FE}}{f_{cl}} \right) \leq p \leq \frac{2}{\sqrt[4]{3}} a \left( \frac{f_{FE}}{f_{cl}} \right) \quad \text{[Equation 3]}$$

Figure 10:
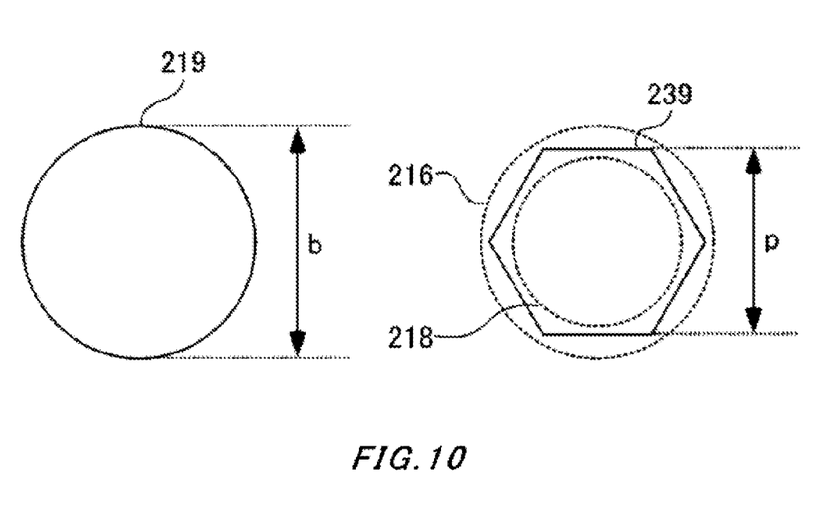
FIG. 10 is a schematic diagram showing a light source image formed on a lens element.

FIG. 10 is a diagram showing an image of a light source 219 projected on the emission surface of the fly-eye lens 230 in the illumination optical system 200. Shown in the illustrated example is a case in which the light source 219 (an optical fiber 219) with diameter b is used instead of the light source 210.

From a similar consideration to the above case in FIG. 9, the diameter and the area of the image of the optical fiber 219 projected on the emission surface of the lens element 239 are expressed by $(f_{FE}/f_{cl})b$ and $\pi(f_{FE}/f_{cl})^2(b/2)^2$ respectively. In the case of using the optical fiber 219 also, it is preferable for the filling rate to be more than or equal to 50% when the image of the optical fiber 219 is projected inside the emission surface of the lens element 239 in a similar manner as that in FIG. 9 described above (an image 218 in FIG. 10). Also, when the image of the optical fiber 219 is larger than the emission surface of the lens element 239 (an image 216 in FIG. 10), it is preferable to make the diameter of the image of the optical fiber 219 shorter than a maximum length (the distance between opposite vertices in FIG. 9) of the lens element 239. Therefore, the pitch p of the lens element 239 is expressed as follows, where b is the diameter of the optical fiber 219.

$$\frac{\sqrt{3}}{2} b \left( \frac{f_{FE}}{f_{cl}} \right) \leq p \leq \frac{\sqrt{\pi}}{\sqrt[4]{3}} b \left( \frac{f_{FE}}{f_{cl}} \right) \quad \text{[Equation 4]}$$

Figure 11:
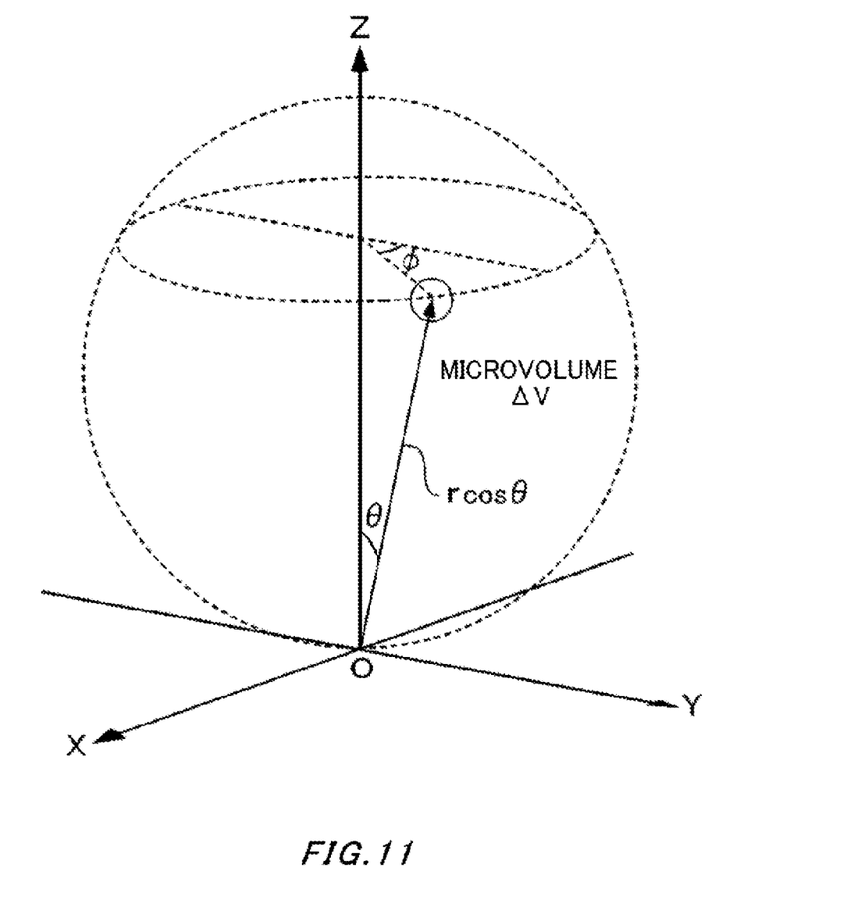
FIG. 11 is a drawing for explaining orientation characteristics of a light source.

Hereinafter, an acceptance angle NA' of light radiated from the light source 210 is described. When an emission angle of the light source 210 is θ, the light intensity is r cos θ. In that case, a microvolume ΔV of the space shown with the polar coordinate shown in FIG. 11 can be expressed by the following Equation 5.

$$\Delta V = r \cos \theta \sin \theta \cdot r \cos \theta d\theta \cdot \cos \theta dr \quad \text{[Equation 5]}$$

Equation 6 is obtained by integrating this equation, which expresses an acceptance light amount in the range within the emission angle θ from a single point of the light-emitting surface of the light source 210.

$$\int \Delta V = \int_0^{2\pi} \int_0^r \int_0^\theta r^2 (\cos \theta)^3 \sin \theta \, d\theta \, dr \, d\varphi \quad \text{[Equation 6]}$$
$$= \frac{2\pi}{3} r^3 \left( \frac{1 - (\cos \theta)^4}{4} \right)$$

Here, considering a loss of the light amount, it is preferable to keep more than or equal to approximately 70% of the acceptance light amount from the single point of the light-emitting surface. Assume that θ1 is an emission angle at which more than or equal to 70% of acceptance light amount can be kept, and consider that the emission angle is 90° when the acceptance light amount is 100%, the equation therefor is as follows.

$$\frac{2\pi}{3} r^3 \left( \frac{1 - (\cos \theta 1)^4}{4} \right) \bigg/ \frac{2\pi}{3} r^3 \left( \frac{1 - (\cos 90°)^4}{4} \right) \geq 0.7 \quad \text{[Equation 7]}$$

The relation in Equation 8 is obtained by solving cos θ1 on this equation and expressing the result by sin θ1.

$$\sin \theta 1 \geq 0.6725 \quad \text{[Equation 8]}$$

Since the acceptance angle NA' is n·sin θ1, and n=1 in the illumination optical system 200, the following Equation 9 is obtained after rounding off to two decimal places.

$$NA' \geq 0.67 \quad \text{[Equation 9]}$$

Thus, by setting each optical parameter such that it satisfies the following Equation 9, more light amount can be taken from the light source 210.

In the above example, although an LED is used as the light source 210 in the illumination optical system 200, it is obvious that the illumination optical system 200 with the fly-eye lens 230 can also accommodate another light source 210, such as a halogen lamp. Also, an emission end which is a waveguide for an optical fiber or the like that introduces illumination light supplied from the outside can be used as the light source 210.

Note that, in the above example, the illumination optical system 200 is used for vertical illumination. However, such illumination optical system 200 with the fly-eye lens 230 described above can also be used for illumination of the sample 180 in transmission illumination observation using the microscope 10. Also, the above illumination optical system 200 may irradiate illumination light for bright field observation, or may irradiate excitation light for fluorescence observation.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: microscope;
100: observation optical system;
110: eye piece;
120, 142, 144: reflection mirror;
132, 134, 136, 242, 244, 284: relay lens;
150: imaging lens;
160: objective lens;
162: revolver;
170: stage;
180: sample;
191: observation surface;
192: primary image;
193: secondary image;
200, 201: illumination optical system;
202: second observation optical system;
209: replacement unit;
210 light source;
212: image;
214: image;
216: image;
218: image;
236: image;
219: optical fiber;
220: collector lens;
230: fly-eye lens;
231, 232, 233, 234, 235: image;
237: image;
239: lens element;
246: variable magnification optical system;
250: field stop;
251: pupil;
252: pupil;
254: pupil;
256: pupil;
270: filter cube;
272: excitation filter;
274: dichroic mirror;
276: barrier filter;
282: camera;
284: relay lens;
286: prism

What is claimed is:

1. A microscope comprising:
an observation optical system including a first objective lens having a predetermined pupil diameter; and
an illumination optical system having a fly-eye lens and configured to irradiate light from a light source to a sample through the fly-eye lens and the first objective lens, wherein:
the fly-eye lens has a plurality of lens elements;
in the illumination optical system, images of the plurality of lens elements are projected inside and on an outer perimeter of a pupil of the first objective lens;
the images of lens elements projected inside the pupil of the first objective lens are images which are surrounded by the images of lens elements which are projected on the outer perimeter of the pupil of the first objective lens; and
a number (n1) of images of lens elements projected inside the pupil of the first objective lens is more than a number (n2) of images of lens elements projected on an outer perimeter of the pupil of the first objective lens.

2. The microscope according to claim 1, further comprising:
a second objective lens having a second pupil diameter larger than the predetermined pupil diameter, and the first objective lens and the second objective lens are switchable.

3. The microscope according to claim 1, wherein:
the first objective lens is one of a plurality of objective lenses having respective pupil diameters different from each other;
the plurality of objective lenses are switchable; and
the first objective lens has the smallest pupil diameter among the plurality of objective lenses.

4. The microscope according to claim 1, wherein:
a set of the light source and the fly-eye lens is detachable.

5. The microscope according to claim 1, wherein:
in the illumination optical system, an acceptance angle NA' of the light radiated from the light source satisfies a following Equation 1, $$NA' \geq 0.67 \qquad \text{[Equation 1]}$$

6. The microscope according to claim 1, further comprising a collector lens to make the illumination light radiated from the light source enter the fly-eye lens, wherein:
when a light-emitting surface of the light source has a square shape, the illumination optical system satisfies a following Equation 2, $$\frac{\sqrt{3}}{2}a\left(\frac{f_{FE}}{f_{cl}}\right) \leq p \leq \frac{2}{\sqrt[4]{3}}a\left(\frac{f_{FE}}{f_{cl}}\right) \qquad \text{[Equation 2]}$$

where p is a pitch of the plurality of lens elements,
a is a length of one side of the light-emitting surface,
WE is a focal distance of the lens elements, and
fcl is a focal distance of the collector lens.

7. The microscope according to claim 1, further comprising a collector lens to make the illumination light radiated from the light source enter the fly-eye lens, wherein:
when a light-emitting surface of the light source has a round shape, the illumination optical system satisfies a following Equation 3, $$\frac{\sqrt{3}}{2}b\left(\frac{f_{FE}}{f_{cl}}\right) \leq p \leq \frac{\sqrt{\pi}}{\sqrt[4]{3}}b\left(\frac{f_{FE}}{f_{cl}}\right) \qquad \text{[Equation 3]}$$

where p is a pitch of the plurality of lens elements,
b is a diameter of the light-emitting surface,
WE is a focal distance of the lens elements, and
fcl is a focal distance of the collector lens.

8. The microscope according to claim 1, wherein the illumination optical system includes:
a variable magnification optical system to change magnification of the images of the plurality of lens elements projected on the pupil of the first objective lens.

* * * * *